United States Patent
Jung et al.

(10) Patent No.: US 9,539,742 B2
(45) Date of Patent: Jan. 10, 2017

(54) CONTINUOUS CARBON FIBER REINFORCED THERMOPLASTIC PLASTIC COMPOSITE HAVING EXCELLENT IMPREGNATION PROPERTIES AND A METHOD FOR MANUFACTURING THE SAME

(71) Applicant: LG Hausys, Ltd., Seoul (KR)

(72) Inventors: Gi-Hune Jung, Bucheon-si (KR); Yong-Hoon Yoon, Daejeon (KR); Hee-June Kim, Seongnam-si (KR); Tae-Hwa Lee, Gwangmyeong-si (KR); Ae-ri Oh, Anyang-si (KR); Jae-Hoon Choi, Anyang-si (KR)

(73) Assignee: LG HAUSYS, LTD., Seoul (KR)

( * ) Notice: Subject to any disclaimer, the term of this patent is extended or adjusted under 35 U.S.C. 154(b) by 226 days.

(21) Appl. No.: 14/370,141

(22) PCT Filed: Dec. 28, 2012

(86) PCT No.: PCT/KR2012/011722
§ 371 (c)(1),
(2) Date: Jul. 1, 2014

(87) PCT Pub. No.: WO2013/105749
PCT Pub. Date: Jul. 18, 2013

(65) Prior Publication Data
US 2015/0000829 A1  Jan. 1, 2015

(30) Foreign Application Priority Data
Jan. 11, 2012  (KR) ......................... 10-2012-0003603

(51) Int. Cl.
  B29B 11/16  (2006.01)
  C08J 5/04  (2006.01)
  (Continued)

(52) U.S. Cl.
  CPC ............. B29B 11/16 (2013.01); B29B 15/122 (2013.01); C08J 5/042 (2013.01); C08J 5/06 (2013.01);
  (Continued)

(58) Field of Classification Search
  CPC ....................................................... B32B 11/16
  (Continued)

(56) References Cited

U.S. PATENT DOCUMENTS 4,495,017 A * 1/1985 Abe ...................... B29B 15/122
156/181

FOREIGN PATENT DOCUMENTS

CN  101474868 A  7/2009
JP  6354441 A  3/1988
(Continued)

OTHER PUBLICATIONS

Torayca cloth, Japan, 2016, Feb. 22, 2016, pp. 1-3.
(Continued)

*Primary Examiner* — Brent O'Hern
(74) *Attorney, Agent, or Firm* — Hauptman Ham, LLP

(57) ABSTRACT

The present disclosure includes a continuous carbon fiber reinforced thermoplastic plastic composite. The continuous carbon fiber reinforced thermoplastic plastic composite includes a continuous carbon fiber impregnated in thermoplastic resin, and the continuous carbon fiber is a continuous carbon fiber has the width of 4 times to 8 times as wide as the original fiber bundle.

8 Claims, 1 Drawing Sheet

(51) Int. Cl.
*B29B 15/12* (2006.01)
*C08K 3/04* (2006.01)
*C08K 5/01* (2006.01)
*C08K 5/06* (2006.01)
*C08K 5/101* (2006.01)
*C08J 5/06* (2006.01)
*C08J 5/24* (2006.01)
*B29K 307/04* (2006.01)
*B29K 101/12* (2006.01)
*B29K 77/00* (2006.01)

(52) U.S. Cl.
CPC .. *C08J 5/24* (2013.01); *C08K 3/04* (2013.01); *C08K 5/01* (2013.01); *C08K 5/06* (2013.01); *C08K 5/101* (2013.01); *B29K 2077/00* (2013.01); *B29K 2101/12* (2013.01); *B29K 2307/04* (2013.01); *B29K 2995/0062* (2013.01); *C08J 2377/02* (2013.01)

(58) Field of Classification Search
USPC .......................................... 428/113; 156/180
See application file for complete search history.

(56) References Cited

FOREIGN PATENT DOCUMENTS

| JP | 07216104 A | 8/1995 |
|----|------------|--------|
| JP | 08323748 A | 12/1996 |
| JP | 11172562 A | 6/1999 |
| JP | 11320737 A | 11/1999 |
| JP | 2003165851 A * | 6/2003 |
| JP | 2007262360 A | 10/2007 |
| JP | 2008179808 A | 8/2008 |
| JP | 2008231289 A | 10/2008 |
| JP | 2009263406 A | 11/2009 |
| JP | 2010270420 A | 12/2010 |
| JP | 2011001410 A | 1/2011 |
| JP | 2011157524 A | 8/2011 |
| KR | 20080114750 A | 12/2008 |
| KR | 20100044391 A | 4/2010 |
| TW | 201144363 A | 12/2011 |

OTHER PUBLICATIONS

Chinese Office Action dated Jan. 28, 2016 in connection with the counterpart Chinese Patent Application No. 201280066593.0.
Japanese Office Action dated Mar. 1, 2016 in connection with the counterpart Japanese Patent Application No. 2014-551182.
Ronald E. Allred et al., "The influence of Sizings on the Durability of High-Temperature Polymer Composites", High Performance Polymers, Apr. 18, 2003, 25 pages, Sage Publications.
European Extended Search Report corresponding to Application No. 128649312 issued on Aug. 21, 2015.
International Search Report for PCT/KR2012/011722 mailed on Apr. 19, 2013.
Japanese Office Action dated Jun. 23, 2015 in connection with the counterpart Japanese Patent Application No. 2014-551182.

* cited by examiner

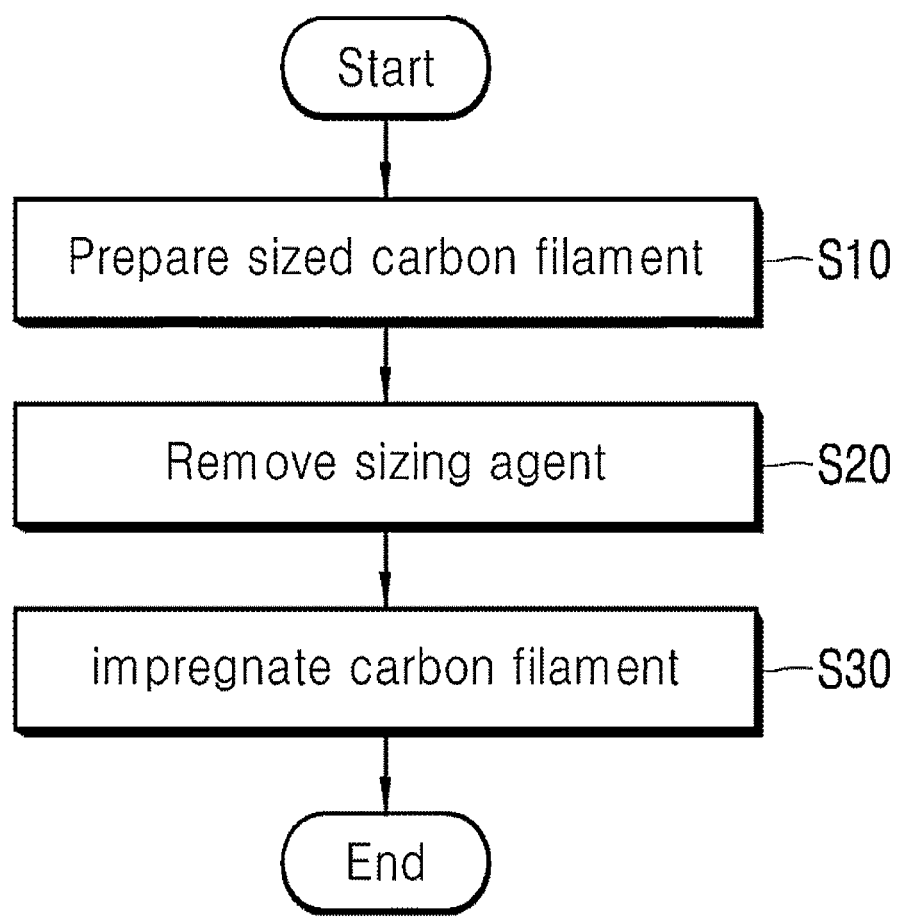

CONTINUOUS CARBON FIBER REINFORCED THERMOPLASTIC PLASTIC COMPOSITE HAVING EXCELLENT IMPREGNATION PROPERTIES AND A METHOD FOR MANUFACTURING THE SAME

Continuous carbon fiber reinforced thermoplastic plastic composite having excellent impregnation properties and a method for manufacturing the same

TECHNICAL FIELD

The present invention relates to a carbon fiber reinforced thermoplastic plastic composite, and more particularly, a continuous carbon fiber reinforced thermoplastic plastic composite having excellent impregnation properties and a method for manufacturing the same.

BACKGROUND ART

Carbon fiber reinforced thermoplastic plastic composites, in which carbon fibers are dispersed in matrix resin, are utilized in broad areas such as automobiles, planes, electrical/electronic optical devices, precision devices, amusement/toys, home/office products, construction materials, etc. in terms of being excellent in light weight, dynamic characteristics, dimensional stability, conductivity, etc., and its demand is increasing yearly.

For a method of obtaining formable substrates from this carbon fiber reinforced thermoplastic plastic composite, a method for impregnating carbon fibers in a tub comprising matrix resin, etc. may be given.

To industrially stably form a high quality carbon fiber reinforced thermoplastic plastic composite, in an impregnation process in which matrix fiber is impregnated in carbon fibers, a carbon fiber bundle comprising thousands of filaments and carrying out matrix fiber impregnation easily and completely is required.

But, because carbon fibers have low elongation, and vulnerable properties, lint may be easily be generated from mechanical friction, and also lacks wettability in respect to matrix resin. Because of this, it is difficult for carbon fibers used as strengthening agents to have excellent properties as described above. To improve this, until now, treatment by sizing agents is carried out in respect to carbon fibers used in strengthening agents of fiber reinforced thermoplastic plastic composites. That is, by carrying out treatment by sizing agents in carbon fibers, along with improving handling of carbon fibers, wettability of matrix resin is also improved.

As an example of this sizing agent, a condensate of epoxy resin, unsaturated dibasic acid, and alkylene oxide adduct of phenol, and a sizing agent alkylene oxide adduct having alkylene oxide adduct of phenol as an essential component was proposed. Also, a sizing agent composed of epoxy resin, alkylene oxide adduct of monocyclic or polycyclic phenol and unsaturated dibasic acid or its ester forming derivative, and a polyester condensate of acid value of 40 or below with alkylene oxide adduct of bisphenol was proposed. Generally, in carbon fiber reinforced thermoplastic plastic composites in which carbon fibers are dispersed in matrix resin, as carbon fibers are dispersed into single fibers, it is advantageous in uniformity of characteristics and surface appearance quality. But in the case of sizing treatment of carbon fibers, it inherits problems of mechanical properties of carbon fiber reinforced thermoplastic plastic composites degrading in accordance with spreading characteristics of carbon fiber bundles in impregnation process.

Meanwhile, for manufacturing fiber reinforced thermoplastic plastics using continuous carbon fibers, normally filaments having 3000 fiber bundles are used. In the case of continuous carbon fiber reinforced thermoplastic plastic composites having 3000 fiber bundles, it inherits problems of having high manufacturing costs due to high raw material costs and low productivity. For related prior publications, there is Japan laid-open patent JP 2009-263406 (made public Nov. 12, 2009).

DISCLOSURE

Technical Problem

An objective of the present invention is to provide a continuous carbon fiber reinforced thermoplastic plastic composite that may improve mechanical properties by excellent impregnation.

Also, another objective of the present invention is to provide a method for manufacturing a continuous carbon fiber reinforced thermoplastic plastic composite that may improve mechanical properties by reducing manufacturing costs and improving impregnation properties.

Technical Solution

A continuous carbon fiber reinforced thermoplastic plastic composite in accordance with the present invention to achieve one of the objective described above comprises a continuous carbon fiber impregnated in thermoplastic resin, and the continuous carbon fiber is a continuous carbon fiber with a width of 4 times to 8 times as wide as an initial fiber bundle width.

A method for manufacturing a continuous carbon fiber reinforced thermoplastic plastic composite in accordance with the present invention to achieve another objective described above comprises preparing a continuous carbon fiber, in which a continuous carbon fiber is sized by a sizing agent comprising a water soluble resin; removing the sizing agent by using a solvent having a difference of solubility parameter with the water soluble resin of 2.0 or below based on SI units ($MPa^{1/2}$); and impregnating a bundle of the carbon fiber that is removed of the sizing agent in a thermoplastic plastic.

Advantageous Effects

A continuous carbon fiber reinforced thermoplastic plastic composite in accordance with the present invention has excellent mechanical properties such as flexural strength and flexural stiffness with respect to thermoplastic plastics.

Also, a method for manufacturing a continuous carbon fiber reinforced thermoplastic plastic composite in accordance with the present invention, may produce a continuous carbon fiber reinforced thermoplastic plastic composite having excellent mechanical properties resulted from the increased degree of impregnation of a continuous carbon fiber regardless of a sizing treatment by a manufacturer by removing a sizing agent by using a solvent having a difference in a solubility parameter from that of a water soluble resin as 2.0 or below base on SI units (MPa1/2).

Furthermore, since the degree of impregnation of the continuous carbon fibers may be increased, a common continuous carbon fiber may be used, and thus the manufacturing cost is lowered and the productivity is excellent.

BRIEF DESCRIPTION OF THE DRAWING

FIG. 1 is a flow chart for describing a method for manufacturing the continuous carbon fiber reinforced thermoplastic plastic composite in accordance with the present invention.

BEST MODE

A continuous carbon fiber reinforced thermoplastic plastic composite in accordance with the present invention comprises a continuous carbon fiber impregnated in thermoplastic resin, and the continuous carbon fiber is a continuous carbon fiber with the width of 4 times to 8 times as wide as the initial fiber bundle width.

For an example, the width of the continuous carbon fiber may be widened from the width of 5 mm as the initial fiber bundle width to the width of 20 mm to 40 mm.

Generally, a continuous fiber having 3000 of a fiber bundle is used for manufacturing a fiber reinforced thermoplastic plastic composites using a continuous carbon fiber, and this incurs high manufacturing costs due to high raw material costs and low productivity. Therefore, in the present invention, by using a continuous fiber having 12000 to 24000 of a fiber bundle being used for general use, the effects of lowering costs and improving productivity may be expected.

The continuous carbon fiber reinforced thermoplastic plastic composite in accordance with the present invention, owing to a high degree of impregnation, has flexural strength of 460 MPa or more, preferably 460 MPa to 680 MPa, and flexural stiffness of 38 GPa or more, preferably 38 GPa to 44 GPa. This is due to improving spreading characteristics (opening properties) of the continuous carbon fiber bundle.

Hereinafter, a method for manufacturing a continuous carbon fiber reinforced thermoplastic plastic composite in accordance with the present invention is described in reference to an accompanying drawing.

FIG. 1 is a flow chart for describing a method for manufacturing a continuous carbon fiber reinforced thermoplastic plastic composite in accordance with the present invention.

Referring to FIG. 1, a method for manufacturing a continuous carbon fiber reinforced thermoplastic plastic composite in accordance with the present invention comprises preparing a continuous carbon fiber (S10), removing a sizing agent (S20), and impregnating a continuous carbon fiber bundle (S30).

Referring to FIG. 1, in preparing a continuous carbon fiber step (S10), a continuous carbon fiber bundle with each carbon fiber filaments sized by a sizing agent comprising a water soluble resin is prepared (S10).

Here, the sized continuous carbon fiber means the one having improved handling properties by having the continuous carbon fiber filament being sized. In the present invention, the sizing property of a continuous carbon fiber means a property for maintaining continuous carbon fiber forms.

The term, a sizing agent, used in the present specification, collectively indicates the materials used for coating agents to change or increase specific physical characteristics of continuous carbon fibers for sizing continuous carbon fiber filaments.

The preparing a continuous carbon fiber step (S10) described above, may use a continuous carbon fiber with the sized filaments of continuous carbon fiber obtained by using conventional methods.

In this instance, for the water soluble resin, for example, polytetrafluoroethylene (PTFE), polyethylene, polypropylene, polystyrene, polyphenylene oxide (PPO), polyvinyl chloride (PVC), polyethylene terephthalate (PET), nylon 6.6, polymethyl methacrylate (PMMA), etc. may be used, and these may be used individually or by mixing 2 or more. But, the water soluble resin is not specifically limited to this.

The solubility parameters of the water soluble resin described above is as shown in Table 1 below. Unit for solubility (δ) is noted as $MPA^{1/2}$, a SI unit.

Here, it is preferable to use the continuous carbon fiber with the width of an initial fiber bundle to be 5 mm, so as to easily make a base material for a formed article with the carbon fiber reinforced thermoplastic plastic composites. And, for a continuous carbon fiber, considering the economic aspects and the productivity aspects, the continuous carbon fiber having 12,000 to 24,000 of a fiber bundle for general use, which has relatively low manufacturing costs compared to one having 3000 of a fiber bundle, may be used.

Meanwhile, in preparing a continuous carbon fiber step (S10), using a sized continuous carbon fiber obtained from a conventional method is presented, but is not limited to this. Apart from this, preparing a continuous carbon fiber step (S10) may be a step of size treating a continuous carbon fiber by using a sizing agent comprising a water soluble resin.

Next, the sizing agent is removed by using a solvent having a difference in the solubility parameter of 2.0 or below based on SI units ($MPa^{1/2}$) (S20) from that of the water soluble resin.

Generally, opening properties of a continuous carbon fiber during impregnation process is determined in accordance with the sizing treatments of a manufacturer, and in the present invention, a sizing agent is removed to improve impregnation properties of the continuous carbon fiber with respect to a matrix resin regardless of the separate sizing treatments depending on manufacturers.

For a solvent used in the present invention, it is preferable to select one that resolves a water soluble resin, which is mainly used for the sizing treatments of the continuous carbon fibers, and does not have chemical influences such as a erosion, etc. on the continuous carbon fibers. Also, it is preferable to select one that does not degrade chemical characteristics of the continuous carbon fibers.

For this, the solvents having a difference in solubility parameter of 2.0 or less, based on SI units ($MPa^{1/2}$) (S20), with that of the water soluble resin is preferable.

For example, n-pentane, n-hexane, diethyl ether, ethyl acetate, chloroform, dichloromethane, 2-propanol, ethanol, etc. may be used, and these may be used individually or by mixing 2 or more.

The solubility parameter of the solvent described above is as shown in Table 1 below. Unit for solubility (δ) is noted as $MPA^{1/2}$, a SI unit.

TABLE 1

| Classification | Material name | δ ($MPa^{1/2}$) | Material name | δ ($MPa^{1/2}$) |
|---|---|---|---|---|
| Solvent | n-pentane | 14.3 | Chloroform | 18.8 |
| | n-hexane | 14.8 | Dichloromethane | 20.3 |
| | Diethyl Ether | 15.6 | 2-propanol | 23.7 |
| | Ethyl Acetate | 18.6 | Ethanol | 26.4 |

TABLE 1-continued

| Classification | Material name | δ (MPa$^{1/2}$) | Material name | δ (MPa$^{1/2}$) |
|---|---|---|---|---|
| Water soluble resin | PTFE | 12.7 | PVC | 19.4 |
| | Polyethylene | 16.2 | PET | 20.7 |
| | Polypropylene | 16.8 | Nylon 6.6 | 28.0 |
| | Polystyrene | 18.7 | PMMA | 19.0 |
| | Polyphenylene oxide | 18.7 | — | — |

That is, the solvent in accordance with the present invention may be adopted in accordance with the water soluble resin comprised in the sizing agent of the continuous carbon fiber.

For example, when using a sized continuous carbon fiber using nylon 6.6, ethanol having solubility parameter difference of 1.8 from nylon 6.6 may be used for a solvent. When using a continuous carbon fiber using polystyrene or polyphenylene oxide, ethyl acetate or chloroform having solubility parameter difference of 0.1 from polystyrene or polyphenylene oxide may be used for a solvent.

Also, the amount of the solvent applied to the continuous carbon fiber during the sizing agent removal process is important because it influences the opening properties of the continuous carbon fiber bundle during the impregnation process. Therefore, using the amount of the solvent in 200 parts by weight to 300 parts by weight based on 100 parts by weight of the continuous carbon fiber is preferable.

When the amount of solvent is less than 200 parts by weight based on 100 parts by weight of the continuous carbon fiber, the opening properties of the continuous carbon fibers in the impregnation process may be degraded due to the residual sizing agents. On the other hand, when the amount of the solvent exceeds 300 parts by weight based on 100 parts by weight of the continuous carbon fiber, sizing is easily loosened, and due to this, becomes tangled by being caught in a middle pin during the continuous process, and also acts as an element generating friction between the pin and the fibers. Also, the solvents may flow down from the continuous carbon fiber bundles and may erode the equipment composite for manufacturing, which is composed of metal.

In accordance with the present invention, the constant amount of solvents may be supplied to the sized continuous carbon fibers using dispensers or pipette, etc.

Dispensers may control the dropping amount of the solvents in accordance with the production speed by using digital methods or analog methods, etc. Since dispensers have to contain the solvents, using one formed with excellent chemical resistant materials is preferable.

Next, the continuous carbon fiber being removed of the sizing agent is impregnated in thermoplastic plastic (S30).

Thermoplastic plastic is not specifically limited, and for example, polyamide (PA), polypropylene, polyethylene, polyacetate, polyethylene terephthalate (PET), acrylonitril-butadiene-styrene (ABS) resin, etc. may be used, and these may be used individually or by mixing 2 or more. Thermoplastic plastic may use shapes of sheets, fabrics, non-woven fabrics, etc.

Meanwhile, the impregnation process may be carried out by making fluids by heating a thermoplastic plastic, and then mixing the continuous carbon fibers in the heated thermoplastic plastic, and then compressing these by applying a pressure.

The impregnation process in accordance with the present invention may improve the opening properties of the continuous carbon fiber in accordance with the present invention by being carried out after removing sizing agents by using the solvent described above, and in this case, the width of initial carbon fiber bundle may be spread uniformly to a wide width of 4 times to 8 times.

That is, when the width of the initial carbon fiber bundle is 5 mm, the continuous carbon fiber may have the width widened to 20 mm to 40 mm after the impregnation process.

Like this, when the opening properties of the continuous carbon fiber bundle is improved, the impregnation properties of the continuous carbon fiber bundle may be improved with respect to thermoplastic plastic, and manufacturing the continuous carbon fiber reinforced thermoplastic plastic composite having excellent mechanical properties such as flexural strength, flexural stiffness, etc. is possible.

Furthermore, since the conventional continuous carbon fiber may be used by increasing the impregnation properties of the continuous carbon fiber, manufacturing cost may be lowered and has the advantages of excellent productivity through reduction in impregnation time.

The continuous carbon fiber reinforced thermoplastic plastic composite in accordance with the present invention may be utilized broadly for preparing a base material for a formed article, for example, automobiles, planes, ships, electronic devices, etc. requiring excellent mechanical properties such as light weight and bending or flexural characteristics, etc.

Hereinafter, performance of the continuous carbon fiber reinforced thermoplastic plastic composite in accordance with the present invention is described in detail from following examples, but the present invention is not limited to these examples.

Example 1

Polyamide 6, which was a matrix substrate, was heated to a temperature of 270° C., and then carbon fiber twilled fabric cross CO6347 (manufactured by Toray) was mixed to volume fraction (wl %) of 49, and then was compressed for 10 minutes under the pressure of 10 MPa, and the composite spread to the width of 20 mm was prepared. And then, the composite was cut with a cutter and a specimen with to a length of 6 mm was manufactured to be measured for flexural strength and flexural stiffness.

Example 2

Except that the composite spread to a width of 40 mm is prepared, it is manufactured identical to Example 1.

Comparative Example

Except that the composite spread to a width of 10 mm is prepared, it is manufactured identical to Example 1.

Physical Properties Measurement Test

<Flexural Strength>

3 point folding test was carried out based on ASTM D638 standard, and its result is shown in Table 2.

<Flexural Stiffness>

3 point folding test was carried out based on ASTM D638 standard, and its result is shown in Table 2.

TABLE 2

| Classification | Width of carbon fiber bundle (mm) | Flexural strength (MPa) | Flexural stiffness (GPa) |
|---|---|---|---|
| Example 1 | 20 | 460 | 38 |
| Example 2 | 40 | 680 | 44 |
| Comparative example | 10 | 310 | 23 |

Referring to Table 2, characteristics of flexural strength and flexural stiffness of examples 1, 2 being excellent compared to comparative example was identified. Especially, example 2, in which the width of the continuous carbon fiber bundle is the widest, showing the most excellent mechanical properties with respect to flexural strength and flexural stiffness was identifiable.

Through this, as the impregnation properties of the continuous carbon fiber with respect to the thermoplastic plastic were improved, the composites having excellent mechanical properties was identified.

Although described mainly by examples of the present invention, various variations and alterations can be made by those skilled in the art. These variations and alterations is within the scope of the present invention as long as it is not outside the scope of the technological concepts provided by the present invention. Therefore, the scope of the present invention should be defined by the appended claims and equivalents thereof.

DESCRIPTION OF SYMBOLS

S10: preparing a sized continuous carbon fiber
S20: removing a sizing agent
S30: impregnating a continuous carbon fiber bundle

The invention claimed is:

1. A continuous carbon fiber reinforced thermoplastic plastic composite comprising a continuous carbon fiber impregnated in thermoplastic resin,
wherein
the continuous carbon fiber has a width of 4 times to 8 times as wide as a width of the continuous carbon fiber before the continuous carbon fiber is impregnated in the thermoplastic resin,
the continuous carbon fiber reinforced thermoplastic plastic composite has a flexural strength of 460 Mpa or more, and
the continuous carbon fiber reinforced thermoplastic plastic composite has a flexural stiffness of 38 Gpa or more.

2. The continuous carbon fiber reinforced thermoplastic plastic composite according to claim 1, wherein the width of the continuous carbon fiber is widened from a width of 5 mm before being impregnated in the thermoplastic resin to a width of 20 mm to 40 mm.

3. The continuous carbon fiber reinforced thermoplastic plastic composite according to claim 1, wherein the continuous carbon fiber is a fiber bundle which has 12,000 to 24,000 fibers.

4. A method for manufacturing a continuous carbon fiber reinforced thermoplastic plastic composite comprising:
preparing a continuous carbon fiber in which carbon filaments are sized by a sizing agent comprising a water soluble resin;
removing the sizing agent by using a solvent having a difference in a solubility parameter from that of the water soluble resin as 2.0 or less based on SI units ($MPa^{1/2}$); and
impregnating a bundle of the carbon fiber that is removed of the sizing agent in a thermoplastic plastic,
wherein
the continuous carbon fiber reinforced thermoplastic plastic composite comprises a continuous carbon fiber impregnated in thermoplastic resin,
the continuous carbon fiber has a width of 4 times to 8 times as wide as a width of the continuous carbon fiber before the continuous carbon fiber is impregnated in the thermoplastic resin,
the continuous carbon fiber reinforced thermoplastic plastic composite has a flexural strength of 460 Mpa or more, and
the continuous carbon fiber reinforced thermoplastic plastic composite has a flexural stiffness of 38 Gpa or more.

5. The method for manufacturing a continuous carbon fiber reinforced thermoplastic plastic composite according to claim 4, one or more selected from n-pentane, n-hexane, diethyl ether, ethyl acetate, chloroform, dichloromethane, 2-propanol, ethanol are used as a solvent.

6. The method for manufacturing a continuous carbon fiber reinforced thermoplastic plastic composite according to claim 4, wherein the solvent is used in an amount of 200 parts by weight to 300 parts by weight based on 100 parts by weight of the continuous carbon fiber.

7. The method for manufacturing a continuous carbon fiber reinforced thermoplastic plastic composite according to claim 4, wherein the solvent is supplied in a constant amount to the sized carbon filament using a dispenser or a pipette.

8. The method for manufacturing a continuous carbon fiber reinforced thermoplastic plastic composite according to claim 4, wherein the continuous carbon fiber is a fiber bundle which has 12,000 to 24,000 fibers.

* * * * *